(12) United States Patent
Onoe et al.

(10) Patent No.: US 9,981,216 B2
(45) Date of Patent: May 29, 2018

(54) EXHAUST GAS PURIFICATION DEVICE AND PARTICULATE FILTER

(71) Applicant: CATALER CORPORATION, Kakegawa-shi, Shizuoka (JP)

(72) Inventors: Ryota Onoe, Kakegawa (JP); Shingo Sakagami, Kakegawa (JP); Tsuyoshi Ito, Kakegawa (JP); Tatsuya Ohashi, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 152 days.

(21) Appl. No.: 15/100,747

(22) PCT Filed: Dec. 1, 2014

(86) PCT No.: PCT/JP2014/081784
§ 371 (c)(1),
(2) Date: Jun. 1, 2016

(87) PCT Pub. No.: WO2015/083670
PCT Pub. Date: Jun. 11, 2015

(65) Prior Publication Data
US 2016/0296873 A1  Oct. 13, 2016

(30) Foreign Application Priority Data
Dec. 2, 2013  (JP) ................. 2013-249169

(51) Int. Cl.
*B01D 50/00* (2006.01)
*B01D 59/50* (2006.01)
(Continued)

(52) U.S. Cl.
CPC ......... *B01D 46/247* (2013.01); *F01N 3/0222* (2013.01); *F01N 2330/30* (2013.01); *F01N 2330/34* (2013.01); *F01N 2330/38* (2013.01)

(58) Field of Classification Search
None
See application file for complete search history.

(56) References Cited

U.S. PATENT DOCUMENTS

| 8,273,315 | B2* | 9/2012 | Kim ................ F01N 3/2066 422/171 |
| 2004/0161373 | A1* | 8/2004 | Ichikawa .......... B01D 46/0001 422/180 |

(Continued)

FOREIGN PATENT DOCUMENTS

| CN | 101384330 A | 3/2009 |
| EP | 2133132 A1 | 12/2009 |

(Continued)

OTHER PUBLICATIONS

Jan. 27, 2015 International Search Report issued in International Patent Application No. PCT/JP2014/081784.
(Continued)

*Primary Examiner* — Amber R Orlando
(74) *Attorney, Agent, or Firm* — Oliff PLC

(57) ABSTRACT

Particulate filter provided in the exhaust gas purification device includes: a wall-flow part having an inlet-side cell that is open only at an end on an exhaust gas inflow side, outlet-side cell adjacent to this inlet-side cell and is open only at an end on an exhaust gas outflow side, a porous wall partitions the inlet-side cell from the outlet-side cell; a straight-flow part having a through cell that penetrates the filter in axial direction and is open at the end on the exhaust gas inflow side as well as the end on the exhaust gas outflow side. In a cross section of the filter orthogonal to its axial direction, cross-sectional areas of the inlet-side cell and outlet-side cell present in an outer peripheral region of the cross section are larger than cross-sectional areas of the inlet-side cells and the outlet-side cell in a central region of the cross section.

11 Claims, 9 Drawing Sheets

(51) Int. Cl.
  *B01D 46/24*    (2006.01)
  *F01N 3/022*    (2006.01)

(56) References Cited

U.S. PATENT DOCUMENTS

| | | |
|---|---|---|
| 2006/0185335 A1 | 8/2006 | Ichikawa |
| 2008/0110341 A1* | 5/2008 | Ketcham .............. F01N 3/0222 95/274 |
| 2015/0040763 A1* | 2/2015 | O'Brien ............. B01D 46/2455 95/273 |

FOREIGN PATENT DOCUMENTS

| | | |
|---|---|---|
| EP | 2371441 A1 | 10/2011 |
| JP | H06-182204 A | 7/1994 |
| JP | 2003-210992 A | 7/2003 |
| JP | 2006-231162 A | 9/2006 |
| JP | 2011-522694 A | 8/2011 |
| JP | 2011-169156 A | 9/2011 |
| JP | 2011-224973 A | 11/2011 |
| JP | 2012-205973 A | 10/2012 |
| JP | 2012-210581 A | 11/2012 |
| WO | 2007/094499 A1 | 8/2007 |
| WO | 2009/148498 A1 | 12/2009 |
| WO | 2013/111793 A1 | 8/2013 |

OTHER PUBLICATIONS

Jun. 7, 2016 International Preliminary Report on Patentability issued in International Patent Application No. PCT/JP2014/081784.
Jan. 12, 2018 Office Action issued in Chinese Patent Application No. 201480066035.3.

* cited by examiner

EXHAUST GAS PURIFICATION DEVICE AND PARTICULATE FILTER

TECHNICAL FIELD

The present invention relates to an exhaust gas purification device that is disposed in an exhaust passage of an internal combustion engine. More particularly, the present invention relates to an exhaust gas purification device that is provided with a particulate filter that captures granular matter in the exhaust gas discharged from an internal combustion engine.

This international application claims priority based on Japanese Patent Application No. 2013-249169 filed Dec. 2, 2013, and the contents of this application are incorporated in their entirety in the present Description by reference.

BACKGROUND ART

It is generally known that, inter alia, particulate matter (PM), which has carbon as its main component, and ash, which is composed of uncombusted components, are present in the exhaust gas discharged from internal combustion engines and are a cause of air pollution. Due to this, the regulations on particulate matter emission levels, along with those on harmful components present in exhaust gas, e.g., hydrocarbon (HC), carbon monoxide (CO), and nitrogen oxides (NOx), are becoming more rigorous with each passing year. Art has thus been proposed for capturing and thereby removing this particulate matter from exhaust gases.

For example, a diesel particulate filter (DPF) for capturing this particulate matter has been disposed in the exhaust passage of diesel engines. In addition, gasoline engines discharge a certain amount of particulate matter with their exhaust gas, although this amount is smaller than for diesel engines, and as a consequence in some instances a gasoline particulate filter (GPF) is also installed in the exhaust passage of gasoline engines. Particulate filters having a wall-flow structure are known here; these are constructed from a large number of cells composed of a porous substrate wherein the inlets and outlets of the large number of cells are blocked in alternation. In a wall-flow particulate filter, the exhaust gas that has entered through a cell inlet passes through the porous cell walls provided as partitions and is discharged towards and at a cell outlet. While the exhaust gas is traversing the porous cell walls, the particulate matter is captured and removed at the wall surface and in the pores in the interior of the wall. Patent Literature 1 is an example of this type of prior art.

CITATION LIST

Patent Literature

[Patent Literature 1] Japanese Patent Application Laid-open No. 2003-210992

SUMMARY OF INVENTION

There is, however, a limit on the amount of particulate matter that can be captured by the cell wall in the wall-flow particulate filter described above, and when particulate matter accumulates in the filter in an amount exceeding this, filter clogging occurs and a large pressure loss then appears. This can result in the appearance of adverse effects such as a deterioration in the fuel consumption efficiency (fuel efficiency) and engine problems. Due to this, with, for example, DPFs, once a prescribed amount or more of particulate matter has accumulated in the filter, filter regeneration is carried out by establishing a high-temperature exhaust gas flow and burning off the particulate matter. With GPFs, for example, filter regeneration is performed by burning off the particulate matter during a fuel cut-off interval.

However, when, for example, a satisfactory regeneration treatment has not been performed due to control deficiencies, or when an operating condition with a relatively low exhaust temperature has persisted, e.g., during engine start up or idling, an abnormal PM accumulation occurs and filter clogging then occurs and this results in the problem of an increased pressure loss. Increases in the pressure loss are desirably kept as small as possible with no decrease in PM trapping efficiency.

The present invention was pursued considering these points, and its primary object is to provide, for the instant particulate filter and for an exhaust gas purification device equipped with this particulate filter, a novel structure that can suppress pressure loss increases while maintaining the PM trapping efficiency.

The exhaust gas purification device provided by the present invention is an exhaust gas purification device that is disposed in an exhaust passage of an internal combustion engine and that is provided with a particulate filter that captures granular matter in an exhaust gas discharged from the internal combustion engine. This particulate filter is provided with a wall-flow part that has an inlet-side cell that is open only at an end on an exhaust gas inflow side, an outlet-side cell that is adjacent to the inlet-side cell and that is open only at an end on an exhaust gas outflow side, and a porous wall that partitions the inlet-side cell from the outlet-side cell; and is provided with a straight-flow part containing a through cell that completely penetrates the filter along the axial direction and that is open at both the end on the exhaust gas inflow side and the end on the exhaust gas outflow side. And, in a cross section of the filter orthogonal to the axial direction, cross-sectional areas of an inlet-side cell and an outlet-side cell present in an outer peripheral region of the cross section are larger than cross-sectional areas of an inlet-side cell and an outlet-side cell present in a central region of the cross section.

Due to this construction, the exhaust gas preferentially flows in the straight-flow part when the accumulation of particulate matter (PM) has advanced in the wall-flow part into which exhaust gas has been introduced, and because of this increases in the pressure loss can be kept low for the particulate filter as a whole. In addition, because the cross-sectional areas of the inlet-side cell and outlet-side cell present in the outer peripheral region of the filter are larger than those of the inlet-side cell and outlet-side cell present in the central region, even when clogging has occurred in the central region of the filter, the PM can still be thoroughly captured in the outer peripheral region with its large trapping capacity. Accordingly, pressure loss increases can be restrained while maintaining the PM trapping efficiency.

In a preferred aspect of the herein disclosed exhaust gas purification device, a cross section of the filter orthogonal to its axial direction is approximately circular, and, defining R as the radius of this cross section, the aforementioned central region is defined as the region from the center of the cross section to at least ½R of the radius R, and the aforementioned outer peripheral region is defined as the region from the outer edge of the cross section to at least ⅕R of the radius R. The PM can be uniformly captured in the filter as a whole by defining the central region and the outer peripheral region in this manner. As a result, pressure losses are reduced and excellent filter characteristics are maintained.

A preferred aspect is configured such that the amount of exhaust gas passing through the wall-flow part of the central region is 90% to 99% where 100% is the total amount of exhaust gas passing through the central region. Due to this construction, the ratio for the central region of the filter between the amount of exhaust gas passing through the wall-flow part and the amount of exhaust gas passing through the straight-flow part assumes a favorable balance, and as a result for the central region of the filter the pressure loss increases caused by clogging can be restrained while maintaining the PM trapping efficiency.

In addition, a preferred aspect is configured such that the amount of exhaust gas passing through the wall-flow part of the outer peripheral region is 92% to 100% where 100% is the total amount of exhaust gas passing through the outer peripheral region. Due to this construction, the ratio for the outer peripheral region of the filter between the amount of exhaust gas passing through the wall-flow part and the amount of exhaust gas passing through the straight-flow part assumes a favorable balance, and as a result for the outer peripheral region of the filter the pressure loss increases caused by clogging can be restrained while maintaining the PM trapping efficiency.

In a preferred aspect of the herein disclosed exhaust gas purification device, the cross-sectional areas of the inlet-side cells and outlet-side cells present in the outer peripheral region are approximately equal and are uniformly larger than those of the inlet-side cells and outlet-side cells present in the central region. Due to this construction, reductions in the PM trapping efficiency can be securely and reliably suppressed.

In a preferred aspect of the herein disclosed exhaust gas purification device, inlet-side cells and outlet-side cells are formed in the filter that have a cross-sectional area that gradually increases from the center of the aforementioned cross section toward the outer edge. The use of such an exhaust gas purification device makes it possible to bring about a more sensitive tuning of the flow rate of the exhaust gas passing through the inlet-side cells and outlet-side cells (wall-flow part) in the filter moving from the center of the cross section to its outer edge. This in turn makes possible a better improvement in the PM trapping efficiency.

In a preferred aspect of the herein disclosed exhaust gas purification device, in the cross section orthogonal to the axial direction of the filter, the cross-sectional area of the through cells present in the outer peripheral region of this cross section is smaller than the cross-sectional area of the through cells present in the central region of this cross section. This construction makes it possible to simply and easily realize a construction in which the cross-sectional areas of the inlet-side cell and outlet-side cell in the outer peripheral region are larger than the cross-sectional areas of the inlet-side cell and outlet-side cell in the central region. This ensures suppression of decrease in PM trapping efficiency.

In a preferred aspect of the herein disclosed exhaust gas purification device, the wall-flow part has a plurality of the inlet-side cells and a plurality of the outlet-side cells disposed in alternation in a grid form. In addition, each of through cells is disposed between an inlet-side cell and an inlet-side cell adjacent thereto and between an outlet-side cell and an outlet-side cell adjacent thereto, disposed along the diagonal direction of the grid formed by the inlet-side cells and outlet-side cells. Due to this construction, exhaust gas overflowing from the wall-flow part rapidly flows into the through cells and as a consequence an even better restraint on pressure loss increases can be exercised. That is, the effects of the present invention can be exhibited at an even higher level.

In a preferred aspect of the herein disclosed exhaust gas purification device, the through cell cross section orthogonal to the axial direction of the filter has a quadrilateral shape and the inlet-side cell cross section orthogonal to the axial direction of the filter and the outlet-side cell cross section orthogonal to the axial direction of the filter have an octagonal shape. With each cell being designed differently as such, an efficient cell arrangement can be realized in the limited cell-occupied space of the filter.

The present invention also provides a particulate filter included in any exhaust gas purification device disclosed herein. That is, this is a particulate filter disposed in an exhaust passage of an internal combustion engine and capturing granular matter in the exhaust gas discharged from the internal combustion engine. This particulate filter includes a wall-flow part including an inlet-side cell that is open only at an end on an exhaust gas inflow side, an outlet-side cell that is adjacent to the inlet-side cell and that is open only at an end on an exhaust gas outflow side, and a porous wall that partitions the inlet-side cell from the outlet-side cell, and also includes a straight-flow part containing a through cell that penetrates the filter in an axial direction thereof and that is open at the end on the exhaust gas inflow side as well as the end on the exhaust gas outflow side. In addition, in the cross section orthogonal to the axial direction of this filter, cross-sectional areas of the inlet-side cell and outlet-side cell present in the outer peripheral region of the cross section are larger than cross-sectional areas of the inlet-side cell and outlet-side cell present in the central region of the cross section. The use of this particulate filter makes possible the realization of a high-performance exhaust gas purification device that can restrain pressure loss increases while maintaining its PM trapping efficiency.

DESCRIPTION OF EMBODIMENTS

Preferred embodiments of the present invention are described below based on the figures. Matters required for the execution of the present invention but not particularly described in this Description (for example, general matters such as those related to the disposition of particulate filters in automobiles) can be understood as design matters for the individual skilled in the art based on the conventional art in the pertinent field. The present invention can be implemented based on the contents disclosed in this Description and the common general technical knowledge in the pertinent field.

Figure 1:
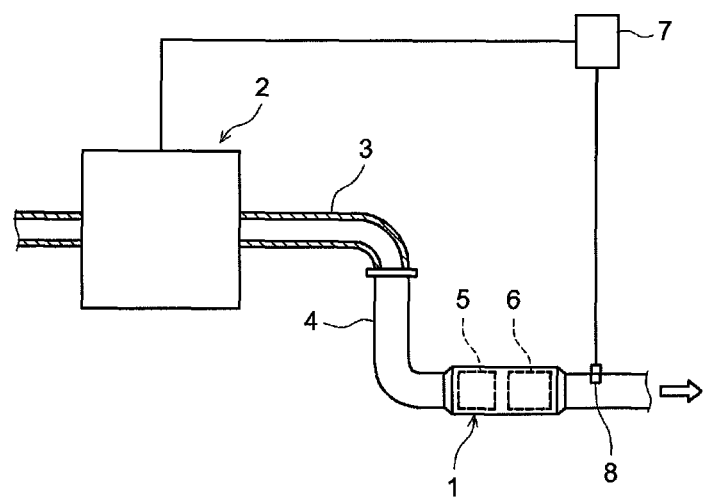
FIG. 1 is a diagram that schematically shows an exhaust gas purification device according to an embodiment.

First, the construction of an exhaust gas purification device according to an embodiment of the present invention is described with reference to FIG. 1. The herein disclosed exhaust gas purification device 1 is disposed in the exhaust system of an internal combustion engine. FIG. 1 is a diagram that schematically shows an internal combustion engine 2 and the exhaust gas purification device 1 disposed in the exhaust system of this internal combustion engine 2.

A mixture containing oxygen and fuel gas is fed to the internal combustion engine (engine) according to the present embodiment. The internal combustion engine causes this mixture to undergo combustion and converts the energy of combustion to mechanical energy. When this occurs, the post-combustion mixture becomes an exhaust gas and is discharged into the exhaust system. The internal combustion engine 2 with the structure shown in FIG. 1 has an automotive gasoline engine as its main component, but an engine other than a gasoline engine (for example, a diesel engine) can also be used.

The exhaust system in this engine 2 is described as follows. An exhaust manifold 3 is connected to an exhaust port (not shown) through which the engine 2 communicates with the exhaust system. The exhaust manifold 3 is connected to an exhaust pipe 4 through which the exhaust gas flows. The exhaust passage of the present embodiment is formed by the exhaust manifold 3 and the exhaust pipe 4.

The herein disclosed exhaust gas purification device 1 is disposed in the exhaust system of the engine 2. This exhaust gas purification device 1 is provided with a catalyst section 5, a filter section 6, and an ECU 7 and purifies harmful components (for example, carbon monoxide (CO), hydrocarbon (HC), and nitrogen oxides ($NO_x$)) present in the discharged exhaust gas and also captures the particulate matter (PM) present in the exhaust gas.

The ECU 7 is a unit that carries out control between the engine 2 and the exhaust gas purification device 1 and contains as constituent elements a digital computer and other electronic devices that are the same as for common control devices. Specifically, an input port is provided at the ECU 7 and is electrically connected to sensors (for example, a pressure sensor 8) that are disposed at respective locations at the engine 2 and/or the exhaust gas purification device 1. By doing this, the data detected at the individual sensors is transmitted via the input port to the ECU 7 as electrical signals. In addition, the ECU 7 is also provided with an output port. Via this output port, the ECU 7 is connected to individual locations at the engine 2 and the exhaust gas purification device 1 and controls the operation of the individual members through the transmission of control signals.

The catalyst section 5 is constructed to have a purification capacity for the three-way components (NOx, HC, CO) present in the exhaust gas and is disposed in the exhaust pipe 4, which communicates with the engine 2. As shown in FIG. 1, it is specifically disposed on the downstream side of the exhaust pipe 4. The type of catalyst section 5 is not particularly limited. For example, the catalyst section 5 may be a catalyst in which a precious metal, e.g., platinum (Pt), palladium (Pd), rhodium (Rd), and so forth, is supported. A downstream catalyst section may additionally be disposed in the exhaust pipe 4 downstream from the filter section 6. The specific construction of this catalyst section 5 is not a characteristic feature of the present invention, and a detailed description here has therefore been omitted.

The filter section 6 is disposed downstream from the catalyst section 5. The filter section 6 is provided with a gasoline particulate filter (GPF) that can capture and remove the particulate matter (referred to below simply as "PM") present in the exhaust gas. The particulate filter according to the present embodiment is described in detail in the following.

Figure 2:
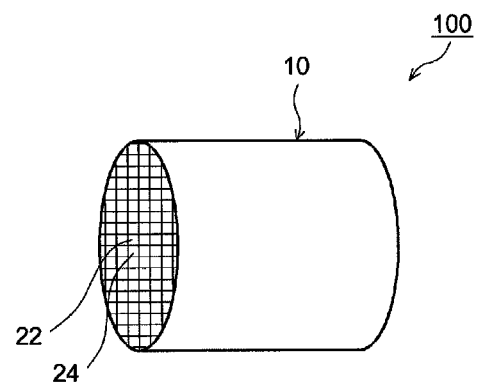
FIG. 2 is a perspective diagram that schematically shows a filter according to an embodiment.

FIG. 2 is a perspective diagram of a particulate filter 100. As shown in FIG. 2, this particulate filter 100 is provided with a filter substrate 10 and, disposed in the interior of this filter substrate 10, cells 22, 24 in a regular arrangement. The various materials and shapes heretofore used in applications of this type can be used for this filter substrate 10 constituting the herein disclosed particulate filter. For example, a honeycomb substrate provided with a honeycomb structure formed from a ceramic, e.g., cordierite, silicon carbide (SiC), and so forth, or an alloy (e.g., stainless steel and so forth) can be advantageously used. A honeycomb substrate having a cylindrical shape for its outer shape (present embodiment) is provided as an example. However, in place of a cylindrical shape, an elliptical shape or polygonal tubular shape may be used for the outer shape of the substrate as a whole.

Figure 3:
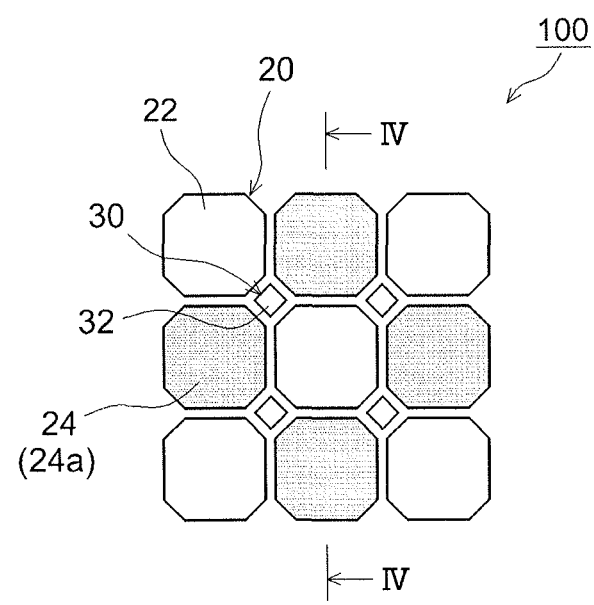
FIG. 3 is a diagram that schematically shows the relevant portion of the end face of a filter according to an embodiment.
Figure 4:
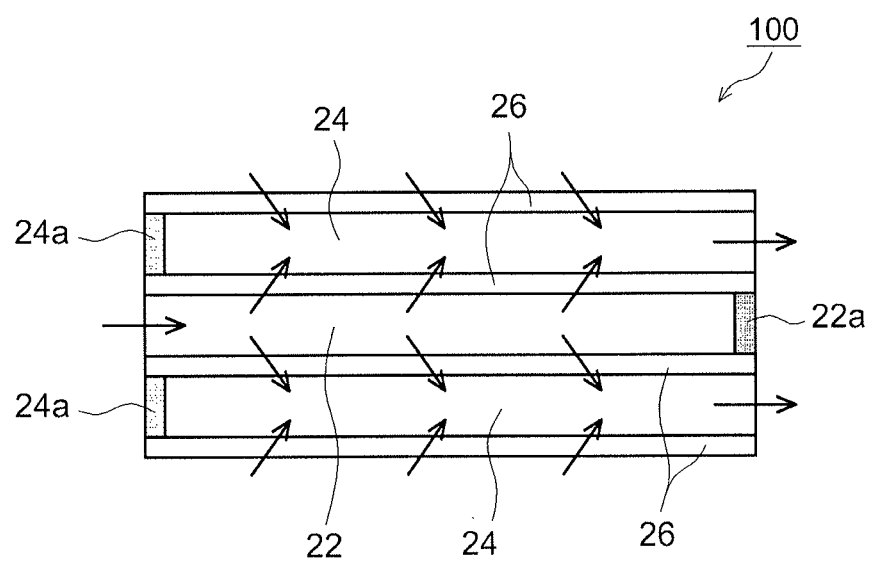
FIG. 4 is a diagram that schematically shows the IV-IV cross section of FIG. 3.

FIG. 3 is a schematic diagram of an enlargement of a portion of the end face of the particulate filter 100 on the exhaust gas inflow side. FIG. 4 is a diagram of the IV-IV cross section of FIG. 3. As shown in FIG. 3, the particulate filter 100 has a wall-flow part 20 and a straight-flow part 30.

<The Wall-Flow Part>

As shown in FIG. 3 and FIG. 4, the wall-flow part 20 is a location where adjacent cells 22, 24 are plugged at the end faces opposite from one another at the two end faces of the filter substrate 10, and has an inlet-side cell 22, an outlet-side cell 24, and a wall 26. In this embodiment, a plurality of inlet-side cells 22 and a plurality of outlet-side cells 24 are disposed in alternation in a grid form.

An inlet-side cell 22 is open only at the end on the exhaust gas inflow side, while an outlet-side cell 24 resides adjacent to an inlet-side cell 22 and is open only at the end on the exhaust gas outflow side. In this embodiment, the end of the inlet-side cell 22 on the exhaust gas outflow side is plugged by a plugging part 22a, while the end of the outlet-side cell 24 on the exhaust gas inflow side is plugged by a plugging part 24a. The inlet-side cell 22 and the outlet-side cell 24 should be configured with an appropriate shape and size based on a consideration of the flow rate and components of the exhaust gas supplied to the filter 100. For example, the inlet-side cell 22 and the outlet-side cell 24 may have various geometric shapes, e.g., a quadrilateral shape such as a square shape, parallelogram shape, rectangular shape, trapezoidal shape, and so forth; a triangular shape; another polygonal shape (for example, a hexagonal shape or octagonal shape); or a circular shape. In this embodiment, the inlet-side cell 22 and the outlet-side cell 24 are octagonal cells having an octagonal shape for the cross section orthogonal to the axial direction of the filter substrate 10. In addition, the inlet-side cell 22 and the outlet-side cell 24 are respectively formed of cells having the same size (cross-sectional area) in the aforementioned cross section.

A wall 26 is formed between an adjacent inlet-side cell 22 and outlet-side cell 24. This wall 26 partitions the inlet-side cell 22 from the outlet-side cell 24. The wall 26 is a porous structure that permits the exhaust gas to pass through it. The porosity of the wall 26 is not particularly limited, but is suitably approximately 50% to 70% and is preferably 55% to 65%. When the porosity of the wall 26 is too small, PM may then end up slipping through; on the other hand, an excessively large porosity for the wall 26 is disfavored because the mechanical strength of the particulate filter 100 then assumes a declining trend. The thickness of the wall 26 is not particularly limited, but is preferably approximately 200 μm to 800 μm. Within this wall thickness range, an inhibitory effect on pressure loss increases can be obtained without a loss in the PM trapping efficiency.

<The Straight-Flow Part>

As shown in FIG. 3, the straight-flow part 30 is provided with a through cell 32 and is a location where the through cell 32 is not plugged at either end face of the filter substrate 10. In this embodiment, a plurality of through cells 32 are disposed along the diagonal directions of the grid formed by the inlet-side cells 22 and the outlet-side cells 24 and between an inlet-side cell 22 and an inlet-side cell 22 adjacent thereto and between an outlet-side cell 24 and an outlet-side cell adjacent 24 thereto.

The through cell 32 completely penetrates the filter 100 along its axial direction. In other words, unlike the inlet-side cell 22 and the outlet-side cell 24 described above, the through cell 32 is open at both its end on the exhaust gas inflow side and its end on the exhaust gas outflow side. The through cell 32 may be configured with an appropriate shape and size considering the flow rate and components of the exhaust gas supplied to the filter 100. For example, the through cell 32 may have various geometric shapes, e.g., a quadrilateral shape such as a square shape, parallelogram shape, rectangular shape, trapezoidal shape, and so forth; a triangular shape; another polygonal shape (for example, a hexagonal shape or octagonal shape); or a circular shape. The through cell 32 may have the same shape as or a different shape from the inlet-side cell 22 and the outlet-side cell 24. In this embodiment, the through cell 32 is a quadrilateral cell having a quadrilateral shape for its cross section orthogonal to the axial direction of the filter 100. In addition, the disposition in this embodiment is such that one side of the quadrilateral shape of the through cell 32 in this cross section is parallel to and opposite from one side of the octagonal shape of an inlet-side cell 22 and an outlet-side cell 24.

To produce the above-described filter 100, for example, a slurry may be prepared in which the main component is a ceramic powder, e.g., of cordierite, silicon carbide (SiC), and so forth, and this may be molded by, for example, extrusion molding, followed by firing. During this, the end on the exhaust gas outflow side of the inlet-side cell 22 may be plugged with a plugging part 22a and the end on the exhaust gas inflow side of the outlet-side cell 24 may be plugged with a plugging part 24a. The porous wall 26 may be formed by mixing a combustible material powder, e.g., a carbon powder, starch, or resin powder, into the slurry and then burning off the combustible material powder. The porosity of the wall 26 can be freely controlled at this point by changing the particle diameter and amount of addition of the combustible material powder.

As shown in FIG. 4, with this exhaust gas purification device the exhaust gas flows in from the inlet-side cell 22 disposed in the wall-flow part 20 of the filter 100. The exhaust gas that has flowed in through the inlet-side cell 22 passes through the porous wall 26 and reaches the outlet-side cell 24. In FIG. 4, the route by which the exhaust gas flowing in through the inlet-side cell 22 passes through the wall 26 and reaches the outlet-side cell 24 is shown by the arrows. Here, because the wall 26 has a porous structure, the PM is captured, during the passage of the exhaust gas through this wall 26, at the surface of the wall 26 and within the pores in the interior of the wall 26. The exhaust gas that has passed through the wall 26 and reached the outlet-side cell 24 is then discharged from the filter through the openings on the exhaust gas outflow side.

With this exhaust gas purification device, the exhaust gas continuously flows in through the inlet-side cell 22 disposed in the wall-flow part 20 of the filter 100. With the progress of PM capture by the wall 26 of the wall-flow part 20 as described above, PM accumulates at the surface of the wall 26 and within the pores in the interior of the wall 26. In addition, the exhaust resistance of the wall-flow part 20 increases as the PM accumulates at the wall-flow part 20, and because of this the amount of exhaust gas passing through the wall-flow part 20 declines and the exhaust gas overflowing from the wall-flow part 20 flows into the straight-flow part 30. Thus, as PM accumulation at the wall-flow part 20 advances in this exhaust gas purification device, the amount of exhaust gas flowing through the wall-flow part 20 declines and the exhaust gas assumes a preferential flow into the straight-flow part 30.

In this case, while a large pressure loss occurs at the PM-loaded wall-flow part 20, the pressure loss at the plug-free straight-flow part 30 is kept low. Due to this, the increase in the pressure loss can be kept small for the filter 100 as a whole. In addition, even when the wall-flow part 20 has become completely clogged, a small maximum value for the pressure loss can be achieved due to the flow of the exhaust gas in the straight-flow part 30. This then makes it possible to prevent adverse effects such as a deterioration in fuel efficiency and engine problems. An exhaust gas purification device 1 having an even higher level of performance can therefore be provided.

In addition, a plurality of inlet-side cells 22 and a plurality of outlet-side cells 24 are disposed in alternation in a grid form in the wall-flow part 20 of this exhaust gas purification device 1. Moreover, through cells 32 are disposed along the diagonal directions of this grid and between an inlet-side cell 22 and an inlet-side cell 22 adjacent thereto and between an outlet-side cell 24 and an outlet-side cell adjacent 24 thereto. With this construction, the exhaust gas overflowing from the wall-flow part 20 rapidly flows into the through cells 32, and as a consequence pressure loss increases can be even more effectively suppressed.

Figure 5:
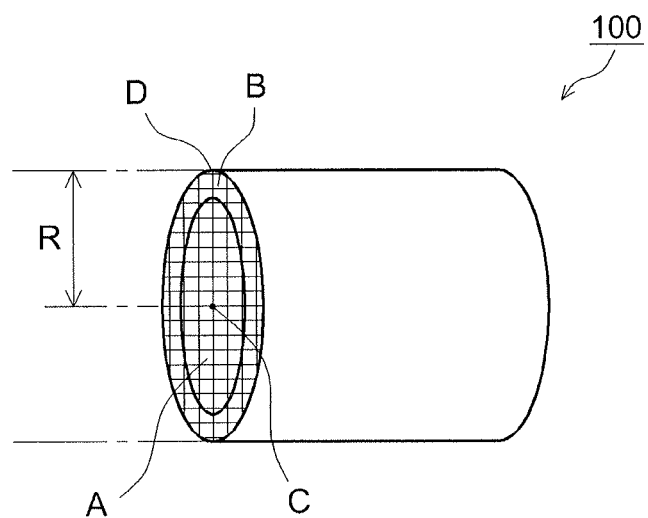
FIG. 5 is a perspective diagram that schematically shows the filter of an exhaust gas purification device according to an embodiment.

The filter 100 of this embodiment is described in detail in the following. FIG. 5 is an external perspective diagram of the filter 100. In the cross section orthogonal to the axial direction of this filter 100, the cross-sectional areas of the inlet-side cells and the outlet-side cells present in the outer peripheral region B of this cross section are larger in the filter 100 than the cross-sectional areas of the inlet-side cells and outlet-side cells present in the central region A of this cross section.

For example, in the example shown in FIG. 5, the cross section orthogonal to the axial direction of the filter 100 (the direction of exhaust gas flow, i.e., the longitudinal direction of the wall-flow part) is approximately circular. In this case, and letting R be the radius of this cross section of the filter 100, for example, the central region A may be defined as the region from the center C of the cross section of the filter 100 to at least ½R (preferably ¾R to ¹⁹⁄₂₀R) of the radius R. The outer peripheral region B may be defined as the region from the outer edge D of the cross section of the filter 100 to at least ¹⁄₂₀R (preferably ¹⁄₁₀ to ½R) of the radius R. In this embodiment, the central region A is defined as the region from the center C of the cross section of the filter 100 to %oR of the radius R. In addition, the outer peripheral region B is defined as the region from the outer edge D of the cross section of the filter 100 to 1/10R of the radius R.

Figure 6:
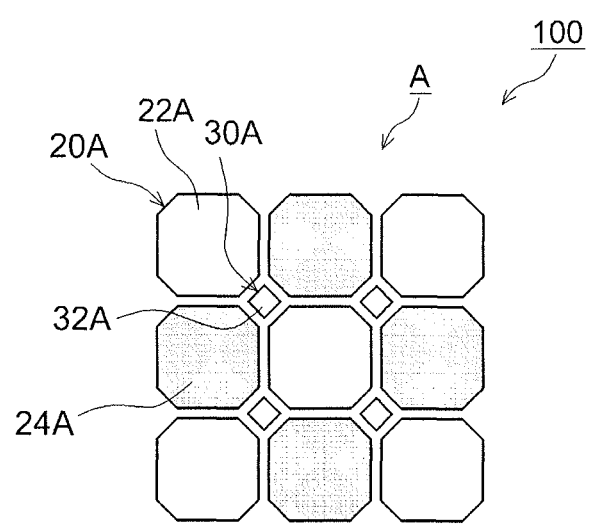
FIG. 6 is a diagram that schematically shows a portion of the end face of a filter according to an embodiment.
Figure 7:
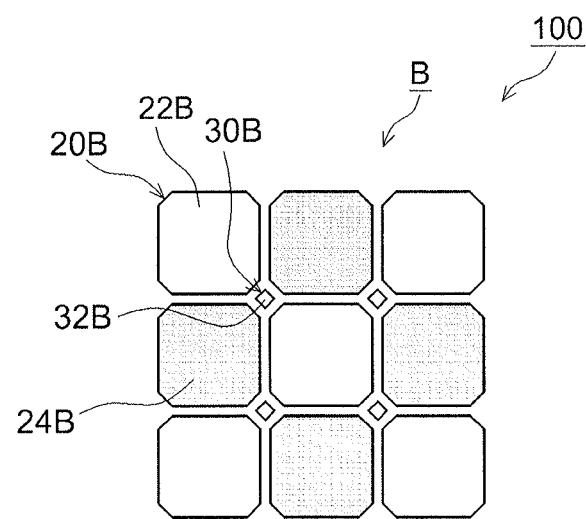
FIG. 7 is a diagram that schematically shows a portion of the end face of a filter according to an embodiment.

FIG. 6 shows a portion of the end face of the exhaust gas inflow side for the central region A of the filter 100. FIG. 7 shows a portion of the end face of the exhaust gas inflow side for the outer peripheral region B of the filter 100. As shown in FIG. 6, the plurality of inlet-side cells 22A and outlet-side cells 24A present in the central region A are formed of octagonal cells each having the same size. In addition, as shown in FIG. 7, the plurality of inlet-side cells 22B and outlet-side cells 24B present in the outer peripheral region B are formed of octagonal cells each having the same size.

As shown in FIG. 6 and FIG. 7, the cross-sectional area of the inlet-side cells 22B and the outlet-side cells 24B present in the outer peripheral region B is larger than the cross-sectional area of the inlet-side cells 22A and the outlet-side cells 24A present in the central region A. For example, the ratio (S1/S2) between the cross-sectional area S1 of an inlet-side cell 22A and an outlet-side cell 24A present in the central region A and the cross-sectional area S2 of an inlet-side cell 22B and an outlet-side cell 24B present in the outer peripheral region B is suitably not more than approximately $19/20$ and is preferably not more than $14/15$ and is particularly preferably not more than $9/10$ (for example, not more than $27/32$). The area ratio (S1/S2) for the herein disclosed inlet-side cells 22A, 22B and outlet-side cells 24A, 24B preferably satisfies $1/2 \leq (S1/S2) \leq 19/20$, more preferably satisfies $2/3 \leq (S1/S2) \leq 14/15$, and particularly preferably satisfies $3/4 \leq (S1/S2) \leq 9/10$. In addition, the cross-sectional area S2 of the inlet-side cells 22B and the outlet-side cells 24B present in the outer peripheral region B is preferably at least 0.1 mm$^2$ larger than the cross-sectional area S1 of the inlet-side cells 22A and the outlet-side cells 24A present in the central region A and is more preferably at least 0.3 mm$^2$ larger. The herein disclosed art can be advantageously executed with an embodiment in which, for example, the cross-sectional area S2 of the inlet-side cells 22B and the outlet-side cells 24B present in the outer peripheral region B is at least 0.5 mm$^2$ larger than the cross-sectional area S1 of the inlet-side cells 22A and the outlet-side cells 24A present in the central region A. In this embodiment, the plurality of inlet-side cells 22A and outlet-side cells 24A present in the central region A each have a cross-sectional area S1 of about 2.7 mm$^2$. The plurality of inlet-side cells 22B and outlet-side cells 24B present in the outer peripheral region B, on the other hand, each have a cross-sectional area S2 of about 3.2 mm$^2$. In this embodiment, the cross-sectional areas of the inlet-side cells 22B and the outlet-side cells 24B present in the outer peripheral region B are thus uniformly larger than those of the inlet-side cells 22A and outlet-side cells 24A present in the central region A. As described below, a catalyst coating layer (not shown) may additionally be provided on the inner wall surfaces of the inlet-side cells 22A, 22B and the outlet-side cells 24A, 24B. When any cell is provided with a catalyst coating layer, the aforementioned area ratio (S1/S2) should be satisfied for the total with the catalyst coating layer for the prescribed amount of the coating.

Here, a large exhaust gas flow rate occurs in high engine operating load regions (for example, when the air intake for a 2.0-L engine is 20 g/sec or more), and due to this there is then a tendency for the exhaust gas to flow in the filter 100 as a whole. On the other hand, a low exhaust gas flow rate occurs in low engine operating load regions (for example, when the air intake for a 2.0-L engine is less than 20 g/sec), and due to this there is then a tendency for the exhaust gas to be concentrated in the central region A of the filter 100. As a consequence, a trend is set up whereby PM accumulation progresses more in the central region A of the filter 100 than in the outer peripheral region B. As PM accumulation progresses in the central region A, the exhaust resistance in the central region A increases and exhaust gas overflowing from the central region A flows into the outer peripheral region B. Thus, as PM accumulation progresses in the central region A, the amount of exhaust gas flowing in the central region A declines and the exhaust gas flows in the outer peripheral region B.

In this embodiment, the cross-sectional areas of the inlet-side cell 22B and outlet-side cell 24B present in the outer peripheral region B are larger than the cross-sectional areas of the inlet-side cells 22A and outlet-side cells 24A present in the central region A. Due to this, even when PM accumulation in the central region A reaches a limit and exhaust gas flows to the outer peripheral region B, the PM can be captured in the wall-flow part 20B of the outer peripheral region B with its large trapping capacity. Accordingly, pressure loss increases due to clogging can be suppressed while maintaining the PM trapping efficiency. Thus, the exhaust gas purification device 1 according to the present embodiment has a high PM trapping efficiency and exhibits low pressure losses and at the same time can exhibit a long-term retention of its characteristics.

In this case, for the example of an average flow rate condition of 15 to 30 m$^3$/min and assigning 100% (volume) to the total amount of exhaust gas passing through the central region A, the configuration is preferably such that the amount of exhaust gas passing through the straight-flow part 30A of the central region A is 1% to 10% (more preferably 2% to 5% and particularly preferably 3±1%). Stated differently, for the state prior to PM accumulation, the configuration is preferably such that 90% to 99% (more preferably 95% to 98% and particularly preferably 97±1%) of the total amount of exhaust gas flowing in the central region A flows in the wall-flow part 20A. The aforementioned effects can be realized at even higher levels at within the indicated range for the exhaust gas flow amount ratio.

In addition, for the example of an average flow rate condition of 15 to 30 m$^3$/min and assigning 100% to the total amount of exhaust gas passing through the outer peripheral region B, the configuration is preferably such that the amount of exhaust gas passing through the straight-flow part 30B of the outer peripheral region B is not more than 8% (more preferably 0.5% to 3% and particularly preferably 1±1%). Stated differently, for the state prior to PM accumulation, the configuration is preferably such that 92% to 100% (more preferably 97% to 99.5% and particularly preferably 99±1%) of the total amount of exhaust gas flowing in the outer peripheral region B flows in the wall-flow part 20B. When the exhaust gas flow amount ratio is within the indicated range, pressure losses are more effectively reduced and excellent filter characteristics are maintained.

As shown in FIG. 6, in this embodiment the plurality of through cells 32A present in the central region A are formed as quadrilateral cells each with the same size. In addition, as shown in FIG. 7, the plurality of through cells 32B present in the outer peripheral region B are formed as quadrilateral cells each with the same size. Moreover, as shown in FIGS. 6 and 7, the cross-sectional area of the through cells 32B present in the outer peripheral region B are uniformly smaller than the cross-sectional area of the through cells 32A present in the central region A. Devising such sizes for the through cells 32A, 32B makes it possible to simply and easily realize a construction in which the cross-sectional areas of the inlet-side cell 22B and outlet-side cell 24B of the outer peripheral region B are larger than the cross-sectional areas of the inlet-side cell 22A and outlet-side cell 24A of the central region A, thereby providing a secure and reliable suppression of reductions in the PM trapping efficiency.

For example, the ratio (S3/S4) between the cross-sectional area S3 of a through cell 32A present in the central region A and the cross-sectional area S4 of a through cell 32B present in the outer peripheral region B is suitably at least approximately 1.1 and is preferably at least 1.15 and is particularly preferably at least 1.2. The area ratio (S3/S4) for the herein disclosed through cells 32A and 32B preferably satisfies 1.1≤(S3/S4)≤1.5, more preferably satisfies 1.15≤(S3/S4)≤1.4, and particularly preferably satisfies 1.2≤(S3/S4)≤1.3. In addition, the cross-sectional area S3 of a through cell 32A present in the central region A is preferably at least 0.01 mm$^2$ larger than the cross-sectional area S4 of a through cell 32B present in the outer peripheral region B and is more preferably at least 0.03 mm$^2$ larger. The herein disclosed art can be advantageously executed with an embodiment in which, for example, the cross-sectional area S3 of the through cell 32A present in the central region A is at least 0.05 mm$^2$ larger than the cross-sectional area S4 of the through cell 32B present in the outer peripheral region B. In this embodiment, the plurality of through cells 32A present in the central region A each have a cross-sectional area S3 of about 0.3 mm$^2$. The plurality of through cells 32B present in the outer peripheral region B, on the other hand, each have a cross-sectional area S4 of about 0.25 mm$^2$.

In a herein disclosed preferred embodiment, in the central region A the ratio (S1/S3) between the cross-sectional area S1 of the inlet-side cell 22A and outlet-side cell 24A and the cross-sectional area S3 of the through cell 32A is suitably at least approximately 5, preferably at least 6, and particularly preferably at least 9. This area ratio (S1/S3) for the inlet-side cell 22A, the outlet-side cell 24A, and the through cell 32A present in the central region A preferably satisfies 5≤(S1/S3)≤20, more preferably satisfies 6≤(S1/S3)≤15, and particularly preferably satisfies 9≤(S1/S3)≤12. The cross-sectional area S1 of the inlet-side cell 22A and outlet-side cell 24A present in the central region A preferably is at least 1.5 mm$^2$ larger and more preferably is at least 2 mm$^2$ larger than the cross-sectional area S3 of the through cell 32A present in the central region A. The herein disclosed art, for example, can be advantageously executed using an embodiment in which the cross-sectional area S1 of the inlet-side cell 22A and the outlet-side cell 24A present in the central region A is at least 2.4 mm$^2$ larger than the cross-sectional area S3 of the through cell 32A present in the central region A.

In a herein disclosed preferred embodiment, in the outer peripheral region B the ratio (S2/S4) between the cross-sectional area S2 of the inlet-side cell 22B and outlet-side cell 24B and the cross-sectional area S4 of the through cell 32B is suitably at least approximately 6, preferably at least 10, and particularly preferably at least 12. This area ratio (S2/S4) for the inlet-side cell 22B, the outlet-side cell 24B, and the through cell 32B present in the outer peripheral region B preferably satisfies 6≤(S2/S4)≤20, more preferably satisfies 10≤(S2/S4)≤18, and particularly preferably satisfies ≤12 (S2/S4)≤15. The cross-sectional area S2 of the inlet-side cell 22B and outlet-side cell 24B present in the outer peripheral region B preferably is at least 2 mm$^2$ larger and more preferably is at least 2.5 mm$^2$ larger than the cross-sectional area S4 of the through cell 32B present in the outer peripheral region B. The herein disclosed art, for example, can be advantageously executed using an embodiment in which the cross-sectional area S2 of the inlet-side cell 22B and the outlet-side cell 24B present in the outer peripheral region B is at least 2.9 mm$^2$ larger than the cross-sectional area S4 of the through cell 32B present in the outer peripheral region B.

3.2 mm$^2$ was used in the aforementioned embodiment for the cross-sectional area S2 of the inlet-side cell 22B and the outlet-side cell 24B present in the outer peripheral region B. The cross-sectional area S2 of the inlet-side cell 22B and the outlet-side cell 24B present in the outer peripheral region B is not limited to this. For example, the cross-sectional area S2 of the inlet-side cell 22B and the outlet-side cell 24B present in the outer peripheral region B can be set to approximately 9 mm$^2$ or less (for example, at least 3 mm$^2$ and not more than 9 mm$^2$).

In addition, 2.7 mm$^2$ was used in the aforementioned embodiment for the cross-sectional area S1 of the inlet-side cell 22A and the outlet-side cell 24A present in the central region A. The cross-sectional area S1 of the inlet-side cell 22A and the outlet-side cell 24A present in the central region A is not limited to this and also should be smaller than the cross-sectional area S2 of the inlet-side cell 22B and outlet-side cell 24B present in the outer peripheral region B. For example, the cross-sectional area S1 of the inlet-side cell 22A and the outlet-side cell 24A present in the central region A can be set to approximately 8.6 mm$^2$ or less (for example, at least 2.8 mm$^2$ and not more than 8.6 mm$^2$).

Also, 0.25 mm$^2$ was used in the aforementioned embodiment for the cross-sectional area S4 of the through cell 32B present in the outer peripheral region B. The cross-sectional area S4 of the through cell 32B present in the outer peripheral region B is not limited to this. For example, the cross-sectional area S4 of the through cell 32B present in the outer peripheral region B can be set to approximately 1.5 mm$^2$ or less (for example, at least 0.1 mm$^2$ and not more than 1.5 mm$^2$).

Also, 0.3 mm$^2$ was used in the aforementioned embodiment for the cross-sectional area S3 of the through cell 32A present in the central region A. The cross-sectional area S3 of the through cell 32A present in the central region A is not limited to this and also should be larger than the cross-sectional area S4 of the through cell 32B present in the outer peripheral region B. For example, the cross-sectional area S3 of the through cell 32A present in the central region A can be set to approximately 1.8 mm$^2$ or less (for example, at least 0.11 mm$^2$ and not more than 1.8 mm$^2$).

An even better expression of the previously described effects can be obtained at within the indicated ranges for the cross-sectional areas S1 to S4 of the cells 22A, 24A, 22B, 24B, 32A, and 32B.

For the instant exhaust gas purification device, the present inventors prepared a filter (Example) in which, as shown in FIGS. 5 to 7, the cross-sectional area of the inlet-side cell 22B and outlet-side cell 24B of the outer peripheral region B was larger than for the inlet-side cell 22A and outlet-side cell 24A of the central region A, and also prepared a filter (Comparative Example) in which the inlet-side cells 22A and 22B and the outlet-side cells 24A and 24B in the two regions were the same size; introduced exhaust gas under the same conditions for each; and measured the PM accumulation time (Hr) and the PM trapping ratio (%). Specifically, in each example the exhaust gas purification device was placed in the exhaust system of a gasoline engine and an exhaust gas throughflow was established at a steady-state operation. A PM sensor was placed upstream and downstream from the filter. The PM trapping ratio (%) was measured while PM was accumulating in the filter. Here, "(value measured by the PM sensor installed downstream from the filter/value measured by the PM sensor installed upstream from the filter)×100" was used for the PM trapping ratio. The results are shown in FIG. 8.

Figure 8:
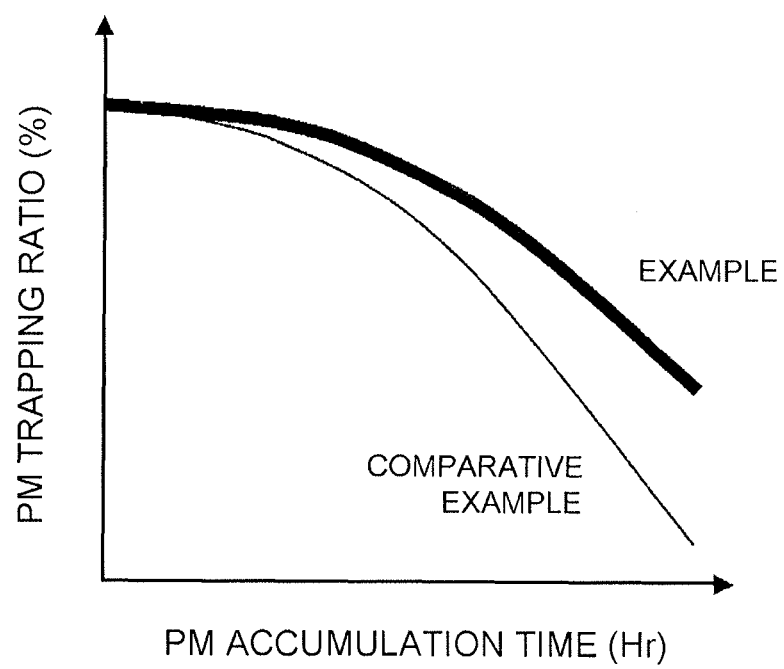
FIG. 8 is a graph that shows the relationship between the PM accumulation time and the PM trapping ratio.

As shown in FIG. 8, the exhaust gas purification device (Example) in which the cross-sectional area of the inlet-side cell 22B and outlet-side cell 24B of the outer peripheral region B was larger than that of the inlet-side cell 22A and outlet-side cell 24A of the central region A, presented a greater suppression of the decline in the PM trapping rate than did the exhaust gas purification device (Comparative Example) in which the inlet-side cells 22A and 22B and the outlet-side cells 24A and 24B in the two regions were the same size. It was thus confirmed from these results that the decline in the PM trapping ratio post-PM accumulation is more favorably suppressed by making the cross-sectional area of the inlet-side cell 22B and the outlet-side cell 24B of the outer peripheral region B larger than that of the inlet-side cell 22A and outlet-side cell 24A of the central region A.

As shown in FIG. 3, a catalyst coating layer (not shown) may additionally be provided in the wall-flow part 20 and the straight-flow part 30. For example, in the wall-flow part 20, a catalyst coating layer can be provided at the surface of the wall 26 and/or in the pores in the interior of the wall 26. A catalyst coating layer formed on the inner wall surface of the through cell 32 can additionally be provided in the straight-flow part 30. In these cases, the catalyst coating layer may contain a porous support and a precious metal catalyst loaded on this support. Such a construction makes it possible to carry out a favorable purification of the harmful components (for example, carbon monoxide (CO), hydrocarbon (HC), $NO_x$, and so forth) in the exhaust gas passing through the wall-flow part 20 and the straight-flow part 30.

The support used for the catalyst coating layer can contain one or two or more elements (typically as the oxide) selected from, e.g., alkali metal elements (typically alkali metal oxides), alkaline-earth metal elements (typically alkaline-earth metal oxides), rare-earth elements (typically rare-earth oxides), Zr (typically zirconia), Si (typically silica), Ti (typically titania), and Al (typically alumina). The use of a support containing these components can realize at least one (and preferably all) of the following: an increase in the mechanical strength, an improvement in durability (thermal stability), an inhibition of catalyst sintering, and an inhibition of catalyst poisoning. The alkaline-earth metal element can be exemplified by magnesium (Mg), calcium (Ca), strontium (Sr), and barium (Ba). The rare-earth metal element can be exemplified by lanthanum (La), scandium (Sc), yttrium (Y), cerium (Ce), praseodymium (Pr), neodymium (Nd), samarium (Sm), and ytterbium (Yb). For example, one or two or more oxides such as alumina ($Al_2O_3$), ceria ($CeO_2$), zirconia ($ZrO_2$), titania ($TiO_2$), silica ($SiO_2$), and so forth, are preferably used.

The precious metal catalyst used in the catalyst coating layer can contain one or two or more elements selected from the platinum group elements. The use of a precious metal catalyst containing these components makes it possible to more reliably purify the harmful components (for example, carbon monoxide (CO), hydrocarbon (HC), NOx, and so forth) in the exhaust gas that passes through the wall-flow part 20 and the straight-flow part 30. The use of rhodium (Rh) in combination with palladium (Pd) or platinum (Pt) is preferred. The use of Rh in combination with Pd or Pt makes possible an even more efficient purification of the harmful components in the exhaust gas. The amount of the precious metal catalyst that is supported is not particularly limited, but approximately 0.5 g to 20 g (preferably 1 g to 10 g) per 1 L of filter volume is preferred. A satisfactory catalytic activity may not be obtained when the amount of supported precious metal catalyst is too small. When the amount of supported precious metal catalyst is too large, the effect due to the loading of the precious metal catalyst tapers off and higher costs are induced, and is thus to be avoided.

The amount of formation of the catalyst coating layer is not particularly limited, but, for example, is preferably approximately 5 g to 500 g (preferably 10 g to 200 g) per 1 L of filter volume. When the amount of the catalyst coating layer per 1 L of filter volume is too small, the functionality as a catalyst coating layer is weak and there is also a risk of causing grain growth by the supported precious metal catalyst. When the amount of the catalyst coating layer is too large, this risks causing an increased pressure loss when the exhaust gas passes through the wall-flow part 20 and the straight-flow part 30.

With regard to the method of loading the catalyst coating layer on the filter, for example, the filter substrate 10 may be immersed in a slurry in which the catalyst components are dispersed. A method can be used in which, after the slurry has been impregnated into the filter substrate 10, drying and firing are carried out in order to immobilize and support the catalyst components at the wall 26 and/or at the inner wall of the through cell 32.

The catalyst coating layer may be formed into a layered structure having an upper layer and a lower layer wherein the lower layer is closer to the surface of the filter substrate 10 and the upper layer is relatively removed therefrom. In this case, for example, Pd or Pt may be supported in one layer separately from Rh in the other layer. By doing this, a suppressing effect can be obtained on the reduction in catalytic activity that is caused by the alloying of Rh with Pd or Pt. This may also be a layered structure of three or more layers that has an additional layer or layers besides the two layers.

An exhaust gas purification device 1 according to an embodiment of the present invention has been described in the preceding, but the exhaust gas purification device according to the present invention is not limited to this embodiment. In the example shown in FIGS. 5, 6, and 7, the cross-sectional area of the inlet-side cell 22B and outlet-side cell 24B present in the outer peripheral region B is uniformly larger than the cross-sectional area of the inlet-side cell 22A and outlet-side cell 24B present in the central region A. The cross-sectional areas of the inlet-side cells 22A, 22B and outlet-side cells 24A, 24B formed in the filter are not limited to this embodiment. For example, as in the filter 200 shown in FIG. 9, inlet-side cells and outlet-side cells may be formed for which the cross-sectional area undergoes a gradual (stepwise) increase moving from the center C of the cross section to its outer edge D.

Figure 9:
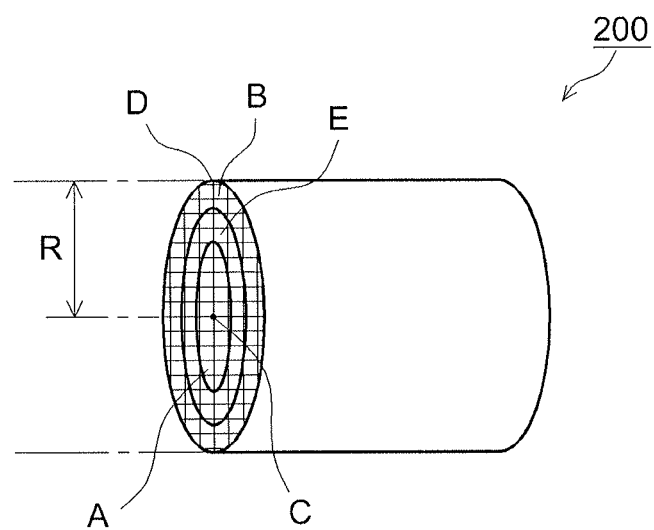
FIG. 9 is a perspective diagram that schematically shows a filter according to an embodiment.

In the example shown in FIG. 9, the central region A is defined as the region out to ½R of the radius R from the center C of the cross section of the filter 200. The outer peripheral region B is defined as the region to ⅛R of the radius R from the outer edge D of the cross section of the filter 200. In addition, an intermediate region E is defined as the region not included by the outer peripheral region B and the central region A. In this case, the inlet-side cells and outlet-side cells formed in the central region A may have the smallest cross-sectional area. The inlet-side cells and outlet-side cells formed in the intermediate region E may have a cross-sectional area larger than that of the inlet-side cells and outlet-side cells formed in the central region A. Moreover, inlet-side cells and outlet-side cells having the largest cross-sectional area may be formed in the outer peripheral region B. Thus, in the filter 200 shown in FIG. 9, the inlet-side cells and outlet-side cells are formed with cross-sectional areas that undergo a stepwise increase moving from the center C of the cross section to the outer edge D.

With the use of this filter 200, in the filter 200 the amount of exhaust gas passing through the inlet-side cells and outlet-side cells (wall-flow part) can be more finely tuned moving from the center C of the cross section of the filter 200 to its outer edge D. This in turn makes possible an even better improvement in the PM trapping efficiency. Also in this case, through a suitable selection of the sizes of the cross-sectional areas of the through cells, inlet-side cells, and outlet-side cells in the central region A, the intermediate region E, and the outer peripheral region B, pressure loss increases can be suppressed without impairing the PM trapping efficiency.

In the filter 200 shown in FIG. 9, the inlet-side cells and outlet-side cells have been divided into three stages in terms of the size of the cross-sectional area moving from the center C of the cross section of the filter 200 to its outer edge D; however, there is no limitation to this embodiment. For example, when a plurality of rows of inlet-side cells and outlet-side cells are formed from the center C of the filter cross section to its outer edge D, the cross-sectional area may gradually increase with each row moving from the center C of the cross section of the plurality of inlet-side cell and outlet-side cell rows to the outer edge D.

In another embodiment, the through cells (straight-flow part) may be omitted from the central region A and the intermediate region E of the filter. Thus, the unplugged through cells (straight-flow part) may be provided only in the outer peripheral region B of the filter. Again in this case, through a suitable selection of the size of the cross-sectional area of the through cells in the outer peripheral region B, pressure loss increases can be suppressed without impairing the PM trapping efficiency.

Various examples of modifications of the exhaust gas purification device 1 and particularly the particulate filter have been provided above as examples, but the structure of the exhaust gas purification device 1 and the particulate filter are not limited to or by any of the embodiments described in the preceding. In addition, the shape and structure of the individual members and positions of the exhaust gas purification device 1 may also be altered. This exhaust gas purification device 1 is, for example, particularly suitable as a device that captures the PM present in an exhaust gas having a relatively high exhaust temperature, such as a gasoline engine. However, the exhaust gas purification device 1 according to the present invention is not limited to the application of capturing the PM in the exhaust gas from a gasoline engine and can be used in various applications for capturing the PM in the exhaust gas discharged from other types of engines (for example, diesel engines).

INDUSTRIAL APPLICABILITY

The present invention can provide an exhaust gas purification device that can inhibit increases in the pressure loss by the filter while maintaining PM trapping efficiency.

The invention claimed is:

1. An exhaust gas purification device disposed in an exhaust passage of an internal combustion engine and provided with a particulate filter capturing granular matter in an exhaust gas discharged from the internal combustion engine, wherein the particulate filter includes:

a wall-flow part including an inlet-side cell that is open only at an end on an exhaust gas inflow side, an outlet-side cell that is adjacent to the inlet-side cell and that is open only at an end on an exhaust gas outflow side, and a porous wall that partitions the inlet-side cell from the outlet-side cell; and a straight-flow part including a through cell that penetrates the filter in an axial direction thereof and that is open at the end on the exhaust gas inflow side as well as the end on the exhaust gas outflow side, and wherein in a cross section of the filter orthogonal to the axial direction, an outer peripheral region and a center region of the cross section are respectively provided with a plurality of inlet-side cells, outlet-side cells, and through cells, cross-sectional areas of each of the inlet-side cells and each of the outlet-side cells present in the outer peripheral region of the cross section are larger than cross-sectional areas of each of the inlet-side cells and each of the outlet-side cells present in the central region of the cross section, and a cross-sectional area of each of the through cells present in the outer peripheral region of the cross section is smaller than a cross-sectional area of each of the through cells present in the central region of the cross section.

2. The exhaust gas purification device according to claim 1, wherein a cross section of the filter orthogonal to the axial direction is approximately circular, and when the radius of this cross section is defined as R, the central region is defined as a region from the center of the cross section to at least ½R of the radius R, and the outer peripheral region is defined as a region from the outer edge of the cross section to at least ⅕R of the radius R.

3. The exhaust gas purification device according to claim 1, configured such that when 100% is a total amount of exhaust gas passing through the central region, the amount of exhaust gas passing through the wall-flow part of the central region is 90% to 99%.

4. The exhaust gas purification device according to claim 1, configured such that when 100% is a total amount of exhaust gas passing through the outer peripheral region, the amount of exhaust gas passing through the wall-flow part of the outer peripheral region is 92% to 100%.

5. The exhaust gas purification device according to claim 1, wherein the cross-sectional areas of the individual inlet-side cells and the individual outlet-side cells present in the outer peripheral region are approximately equal and are uniformly larger than the cross-sectional areas of the inlet-side cells and the outlet-side cells present in the central region.

6. The exhaust gas purification device according to claim 1, wherein inlet-side cells and outlet-side cells are formed in the filter that have a cross-sectional area that gradually increases from the center of the aforementioned cross section toward the outer edge.

7. The exhaust gas purification device according to claim 1, wherein the wall-flow part has a plurality of the inlet-side cells and a plurality of the outlet-side cells disposed in alternation in a grid form, and the through cell is disposed along the diagonal direction of the grid and between an inlet-side cell and an inlet-side cell adjacent thereto and between an outlet-side cell and an outlet-side cell adjacent thereto.

8. The exhaust gas purification device according to claim 1, wherein
a through cell cross section orthogonal to the axial direction of the filter has a quadrilateral shape, and
an inlet-side cell cross section orthogonal to the axial direction of the filter and an outlet-side cell cross section orthogonal to the axial direction of the filter have an octagonal shape.

9. The exhaust gas purification device according to claim 1, wherein the internal combustion engine is a gasoline engine.

10. A particulate filter that is provided in an exhaust gas purification device according to claim 1.

11. A particulate filter disposed in an exhaust passage of an internal combustion engine and capturing granular matter in an exhaust gas discharged from the internal combustion engine,
the particulate filter comprising:
a wall-flow part including an inlet-side cell that is open only at an end on an exhaust gas inflow side, an outlet-side cell that is adjacent to the inlet-side cell and that is open only at an end on an exhaust gas outflow side, and a porous wall that partitions the inlet-side cell from the outlet-side cell; and
a straight-flow part including a through cell that penetrates the filter in an axial direction thereof and that is open at the end on the exhaust gas inflow side as well as the end on the exhaust gas outflow side, wherein
in a cross section of the filter orthogonal to the axial direction,
an outer peripheral region and a center region of the cross section are respectively provided with a plurality of inlet-side cells, outlet-side cells, and through cells,
cross-sectional areas of each of the inlet-side cells and each of the outlet-side cells present in the outer peripheral region of the cross section are larger than cross-sectional areas of each of the inlet-side cells and each of the outlet-side cells present in the central region of the cross section, and
a cross-sectional area of each of the through cells present in the outer peripheral region of the cross section is smaller than a cross-sectional area of each of the through cells present in the central region of the cross section.

* * * * *